July 30, 1963 R. W. KETCHLEDGE 3,099,820
OPTICAL STORAGE SYSTEM
Filed March 31, 1959
FIG. 1
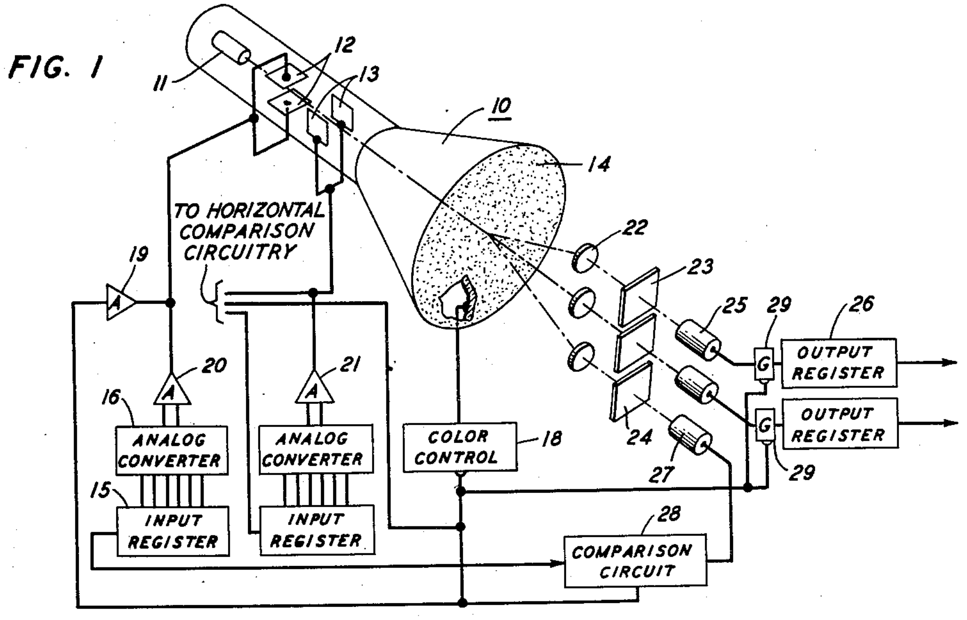
FIG. 2
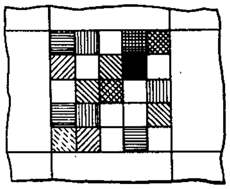
FIG. 3
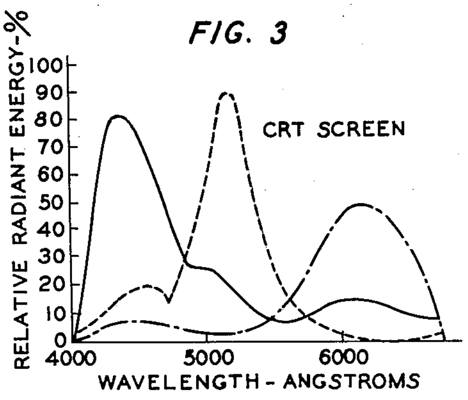
FIG. 4
| PASS BAND ON SLIDE | PASS BAND ON SCREEN 5400-7000A | 4900-5400A | 4000-4900A | OUTPUT NUMBER |
|---|---|---|---|---|
| OPAQUE | 0 | 0 | 0 | 0 |
| 4000-4900A | 0 | 0 | 1 | 1 |
| 4900-5400A | 0 | 1 | 0 | 2 |
| 4000-5400A | 0 | 1 | 1 | 3 |
| 5400-7000A | 1 | 0 | 0 | 4 |
| 4000-4900A 5400-7000A | 1 | 0 | 1 | 5 |
| 4900-7000A | 1 | 1 | 0 | 6 |
| TRANSPARENT | 1 | 1 | 1 | 7 |
| | PHOTO RESPONSE - OUTPUT SIGNAL | | | |
INVENTOR
R. W. KETCHLEDGE
BY
R. C. Winter
ATTORNEY United States Patent Office 3,099,820

Patented July 30, 1963

3,099,820

OPTICAL STORAGE SYSTEM

Raymond W. Ketchledge, Whippany, N.J., assignor to Bell Telephone Laboratories, Incorporated, New York, N.Y., a corporation of New York Filed Mar. 31, 1959, Ser. No. 803,239
7 Claims. (Cl. 340—173)

This invention relates to information storage or memory systems, and more particularly to such systems especially suitable for relatively permanent storage of large quantities of information.

One type of rapid access memory in which the stored information requires change at relatively infrequent intervals utilizes electron discharge devices to provide a system of the type known as the Flying Spot Store. Such a system is disclosed in Patent 2,830,285, issued to R. C. Davis and R. E. Staehler, April 8, 1958.

In a flying spot storage system, a concentrated electron beam is projected from an electron gun of a cathode ray tube against the inner face of a luminescent screen or target thereof. Appropriate address information is applied to the deflection system so as to deflect the beam to a particular discrete area of the screen. Light emanating from the spot produced by the beam impinging the discrete area of the screen is focused by a suitable lens system upon a discrete area of a storage surface. Each such discrete area on the storage surface possesses peculiar light transmission characteristics such that a photosensitive device positioned to receive light passing through the storage surface will react to provide electrical output signals corresponding to the information contained in the area of light impingement on the storage surface.

The electron beam and thus the consequent light beam are deflected in two coordinate directions; e.g., they may be repeatedly swept in one direction and selectively deflected in the other direction, or they may be deflected such that the light beam impinges a particular spot on the storage surface if completely random access is desired.

The information is stored by a photographic process as opaque and nonopaque areas on a storage slide. Light passing through a nonopaque area represents one information condition which is indicated by an output signal from the photosensitive device. Light striking an opaque area of the slide fails to reach the photosensitive device, and lack of an output signal at this time indicates another information condition.

In order to assure exact beam positioning on a particular discrete area of the storage slide, regardless of the density of storage of information thereon, a servo system is employed in which information taken from the storage slide in accordance with the initial beam position is compared with the information utilized to address the beam. The comparison resultant, if any, is applied to the deflection system of the cathode ray tube to reposition the beam to the exact desired position.

The number of completely separate bits of information that can be represented on the storage slides in such a system is limited by the beam spot size and shape. Storage capacity may be increased by splitting the beam and focusing it through a multiple lens system simultaneously on a plurality of storage and servo information slides. A further increase in storage capacity may be obtained by deflecting the electron beam through wider angles so that the light beam traverses a greater area on the storage slide. There are practical limits, however, to the width of the angle that can be employed.

At first is might appear that more separate bits of information could be represented by a larger cathode ray tube. Unfortunately, however, the spot size produced by the electron beam tends to increase as the size of the tube increases, the consequent light beam increasing in size a corresponding amount. Also, the wider optical angles encountered in such a tube reduce the ability of the optical system to resolve the spots.

In accordance with the system disclosed in the aforementioned patent, information is stored as binary number representations, each discrete area being processed so as to transmit or not transmit light through the slide, thereby representing a "zero" or "one" condition or, alternatively, an "on" or "off" condition, as the two binary code conditions are frequently described. Thus each storage area can provide only one of two output conditions, and a plurality of such storage areas is required to supply the necessary binary digits or "bits" of information to form a binary code number or "word." For example, to read the number 5 from a storage system of this type in which the storage slides are prepared to incorporate the conventional binary number code, the light beam must be directed to three discrete storage areas exhibiting, respectively, nonopaque, opaque and nonopaque conditions. Output signals may then be derived from the associated photosensitive device representing the binary digits 101, the binary number corresponding to the decimal number 5.

The physical size and discrete area storage capacity described hereinbefore confines the system capacity to limits too narrow for many applications. One manner in which these limitations are overcome is disclosed in my Patent 2,834,005, issued May 6, 1958, in which the information storage capacity of each discrete area of the storage medium is increased by employing color filter material on the storage slides together with a combination of dichroic mirrors with the output photosensitive devices. In accordance with the instant invention, a comparable increase in storage capacity is realized in a flexible and economical arrangement.

It is an object of this invention to provide an improved beam storage system.

It is another object of this invention to improve the operation of beam storage systems and particularly to increase the storage capacity of such systems.

It is a further object of this invention to provide a flexible and economical beam storage system utilizing color filter storage plates.

It is still another object of this invention to permit rapid reading of information from a beam storage system.

These and other objects of this invention are attained in one specific embodiment thereof wherein the information storage slide or slides comprise discrete areas of different light transmission characteristics, such as are obtained by use of color filter material, and the cathode ray tube is provided with a tricolor screen.

In this specific embodiment, a single photocell is associated with each information storage slide and is positioned to receive light from the tricolor screen which is transmitted through any discrete area of the corresponding information storage slide. The photocell in turn forms electrical signals indicative of a binary number or numbers in response to such received light. Thus, for example, a discrete area of the information storage slide may be processed so as to pass light only in one of three wavelength bands. In addition, the color selection circuit of the cathode ray tube may be programed such that the particular reference spot on the surface of the cathode ray tube, corresponding to the selected discrete area of the storage slide, provides light in each of the three wavelength bands, in sequence. A suitable focusing system is employed to direct the light beam from the cathode ray tube target surface to the storage slides and from there to the associated photosensitive devices. The resultant sequence of binary digit output indications would provide a distinct three-digit binary number.

It may be noted that the combination of a selective color arrangement at the cathode ray tube screen and the particular color filter material utilized at a discrete area of the storage slide, determines any one of a plurality of binary digits which the photosensitive device receiving light from a corresponding storage slide may represent to an appropriate output circuit or register. Thus, in this instance, a particular discrete area of the storage slide, dependent upon the color filter material present thereon, will provide any one of a plurality of binary digit indications to the associated output register through the photosensitive device, dependent upon the particular color of light received from the cathode ray tube, as determined by the color selection at the cathode ray tube. Also, by combining the output indications from a plurality of storage slides addressed simultaneously by a light beam from a particular discrete position on the cathode ray tube target surface, a large number of variable stored indications may be realized.

Advantageously, in accordance with this system arrangement, the servo positioning slides, required to assure exact beam positioning, are prepared so as to present only opaque and transparent discrete areas to the color selected beam rather than the color filter areas on the information storage slides. The use of a color cathode ray tube in this regard does not detract from the efficiency of the servo beam positioning system utilizing the opaque and transparent positioning slide.

It is a feature of this invention that information be stored on discrete areas of the information storage slide in a manner to provide distinct light transmission characteristics in combination with selective light transmission characteristics of the device providing the light beam impinging on the storage slide.

It is a more particular feature of this invention that a cathode ray tube selectively provide light beams in a plurality of different wavelength bands and each of a plurality of discrete areas of an information storage slide positioned to receive light from the cathode ray tube screen be processed to permit passage of light in certain wavelength bands and to absorb light in other wavelength bands.

It is another feature of this invention that a single photosensitive device be positioned to receive multiple information indications from any discrete area of the information storage slide.

It is a further feature of this invention that beam positioning slides having opaque and transparent light transmission characteristics be employed to receive the selected color light from the cathode ray tube and to provide, in combination with a comparison circuit, appropriate beam positioning information.

A complete understanding of this invention and of these and various other features thereof may be gained from consideration of the following detailed description and the accompanying drawing, in which:

FIG. 1 is a diagrammatic representation of one specific illustrative embodiment of this invention;

FIG. 2 is a diagram of a portion of the information storage slide employed in one specific embodiment of this invention and which is drawn to a larger scale than that used in FIG. 1 to illustrate the arrangement of discrete information bearing areas on the storage slide;

FIG. 3 is a graphical representation of the light output of a tricolor screen in the cathode ray tube for use in one specific illustrative embodiment of this invention; and FIG. 4 is a chart depicting the relationship of screen and slide transmission characteristics to output binary code numbers as utilized in one specific illustrative embodiment of this invention.

Referring now to the drawing, FIG. 1 depicts an illustrative embodiment of this invention utilizing a cathode ray tube 10 arranged for color transmission. As known in the art, the tube 10 may comprise within an evacuated envelope an electron gun shown generally at 11. The electron gun produces a concentrated electron beam which is projected centrally between two pairs of deflection plates 12 and 13 mounted in space quadrature. Other means for deflecting the beam as known in the art may be employed; such as, for example, magnetic deflection coils, and the deflection plates disclosed herein are merely for purposes of illustration.

The electron beam is projected against a target surface 14 which forms the face of the cathode ray tube. Advantageously, the screen 14 comprises a plurality of superimposed layers of different color-producing phosphors, as known in the art. Such a target arrangement permits the positioning of the cathode ray tube beam at a maximum number of discrete areas on the screen 14 so as to permit a selected color light beam to impinge a maximum number of discrete areas on a storage slide.

The deflection plates 12 and 13, which are energized from vertical and horizontal deflection circuits through deflection amplifiers 20 and 21, respectively, serve to deflect the electron beam to a desired discrete area of the screen 14. The horizontal deflection circuitry advantageously is identical to the circuitry for vertical deflection so that a description of the vertical deflection circuitry will suffice to describe the structure and operation of this circuitry. Binary information is fed into an input register 15, indicating a particular address or start location of information to be read out of the system. The input information for an address location in each coordinate may consist of any suitable number of binary digits sufficient to locate the desired discrete storage area. Thus the input register 15 and its associated analog converter 16 may be of any of a number of circuits known in the art which are capable of generating analog representations on application thereto of simultaneous input pulses; e.g., input register 15 may comprise a series of bistable flip-flop units arranged to feed simultaneously through diodes of analog converter 16, thereby passing analog stepped amounts of current to amplifier 20. Amplifier 20 in turn supplies output voltages to the vertical deflection plates 12, representing a summation of analog values in the deflection circuit.

The electron beam is deflected in accordance with voltages applied to the deflection plates 12 and 13 so that it impinges a discrete area of the target screen 14 and produces a spot of light thereat dependent upon the particular color selected by the color selection circuitry. For example, the color selection circuitry may comprise a voltage switching unit 18 for providing analog stepped amounts of voltage to a post-deflection electrode at the screen 14 in a preselected sequence. Such an arrangement permits adjustment of the potential of the electron beam so as to allow the electrons to penetrate to a certain depth in the plural layers of the target screen 14 before giving up a substantial part of their energy which, in the case of phosphors, is manifested in a light effect.

Each distinct voltage level in conjunction with the electron beam produces a distinct one of the three colors, available at the target. At the outset, the voltage level provided by the switching unit 18 is such as to produce a first one of the colors. In order to permit an operation involving selection of the colors at the target in sequence, a connection is made to the comparison circuit 28, described in more detail hereinafter, which assures positioning of the electron beam to the precise position dictated by the input address. When such a position has been reached, the output of comparison circuit 28 is essentially zero, such that the inhibit input to the color control unit 18 and output gates 29 is removed.

Removal of the inhibit signal enables a sequence circuit in the color control unit 18 which serves to provide the desired sequence of voltage levels at the target 14 to produce the three colors in the light beam in sequence while the beam is maintained in the same position. During this sequence the output gates 29 are enabled such that output signals resulting from the sequence of colored light beams are stored in appropriate output circuitry.

Upon completion of the sequence, the beam deflection address in the input registers will be changed, the comparison circuit will provide a positive output signal indicating a movement of the beam, and the color control unit 18 will be inhibited. The color sequence operation in the control unit 18 thus is suspended and the output gates 29 are disabled. This assures that false output information developed during movement of the beam is not recorded in the output circuitry.

Again the described manner of operation, in this instance of post-deflection acceleration for color selection, serves merely to illustrate the use of a color cathode ray tube in a storage system, and numerous other methods of selecting a proper color in the cathode ray tube are available. The present example serves to indicate, however, the simplicity of circuitry required in color selection at the cathode ray tube which, in turn, provides a more flexible and compact information storage and readout system when combined with the other elements of the system in accordance with my invention.

A lens system comprising individual lenses such as 22 is positioned to focus the light beam resulting from impingement of the electron beam on the cathode ray tube screen 14 on information storage slides such as slide 23 and servo positioning slides such as slide 24. Any number of information storage slides such as 23 may be employed so long as arranged consistent with focusing and output indicating means associated with each slide. Two servo positioning slides 24 are required, one for each deflection coordinate. Only the vertical coordinate servo positioning circuit is shown in FIG. 1 for simplicity, the horizontal positioning circuit being identical.

FIG. 2 s a fragmentary view showing the construction of the information storage slide which may advantageously be employed in embodiments of this invention. A coating of a suitable photoemulsion is applied to a transparent base such as a glass plate and patterns of different color filter areas are formed in the emulsion in accordance with information which it is desired to store in the system.

An example of binary words which may be stored in one of the information storage slides 23 is shown in FIG. 2, considerably enlarged from actual size. Each discrete area may be processed to present a distinct one of a plurality of different light transmission characteristics including transparent, opaque and various color filters capable of transmitting different levels or bands of light. Such distinct discrete areas are indicated in FIG. 2 by corresponding distinct designs. As explained further hereinafter, each discrete area represents a number of bits or binary digits of the stored binary number or word.

In accordance with my invention, employment of any one of a number of different color filters on a discrete information area in combination with the selective color control of the light beam impinging thereon, permits an increase in the bit storage potential of each discrete area and thus increases the storage capacity of the system. Utilizing different color filters and combinations thereof, plus opaque and transparent, in conjunction with a tricolor light beam source, a different, three-digit binary number may be stored on each of the twenty-five discrete areas of the storage side illustrated in FIG. 2. With an *n* color light beam source, the storage slide may be arranged such that any one of $2^n$ binary numbers of *n* digits each can be written in a single discrete area. Commercially available types of color film operate on a tricolor basis and are suited, therefore, in combination with the tricolor television tube, for storage of three binary digits at each spot.

Slide 23, FIG. 1, is arranged to provide one of eight, three-digit binary numbers per discrete area in accordance with the different filter areas shown in FIG. 2. Light passing through the slide 23 impinges and activates a photosensitive device 25 and causes an electrical signal to be passed to an output register 26.

The photosensitive device 27 is representative of a plurality of such devices positioned to receive light from the beam positioning slide 24 for the vertical deflection coordinate and arranged to transmit the received light to a comparison circuit 28 in the form of electrical signals in conjunction with the initial vertical deflection signals from the input register 15. In this instance the servo positioning circuit may be of the type set forth, for example, in C. W. Hoover, Jr., Patent 2,855,539, issued October 7, 1958. A typical comparison circuit included in this servo positioning circuit and capable of performing all of the functions desired of the circuit 28 is shown, for example, in my Patent 2,923,476, issued February 2, 1960. A similar arrangement is of course provided for the other deflection coordinate. The resultant obtained from the comparison in circuit 28 is transmitted to the deflection plates for the particular coordinate; in this instance, through amplifier 19 to vertical deflection plates 12.

The servo arrangement assures exact positioning of the electron beam, and transfer of information to the output registers such as 26 is deferred by appropriate circuitry until such an exact beam position has been obtained.

The beam positioning slide 24 for each coordinate is prepared in similar fashion to the information storage slide 23, with the exception that color filter material is not employed. Instead, opaque and transparent designations on each coordinate beam positioning slide are sufficient to facilitate operation of the servo network in conjunction with the color light beam received from the cathode ray tube 10.

FIG. 3 illustrates typical emission characteristics of a tricolor cathode ray tube utilizing phosphors in layers at the screen. As may be noted, such a screen advantageously may be utilized in this specific embodiment of my invention to provide substantial radiant energy in three distinct wavelength bands. Arrangement of the phosphors in layers at the screen is preferable over other known arrangements in that such an arrangement permits utilization of a minute cross-section electron beam and a consequent minute cross-section light beam to impinge only the discrete area of the information storage slide from which it is desired to extract information. The division into three distinct wavelength bands, as shown in FIG. 3, provides adequate radiant energy in each distinct band to produce a satisfactory response from the photosensitive devices positioned behind the information storage slides.

FIG. 4 indicates the three-digit binary numbers produced by the output signals of the photosensitive devices in response to the selected color light transmitted through various color filter areas of the information storage slide in this specific embodiment of the invention. The spectral distribution of the phosphors at the cathode ray tube screen is divided into three wavelength pass bands; namely, 4000 A.–4900 A., 4900 A.–5400 A. and 5400 A.–7000 A. Various filter materials on the information storage slide serve to absorb certain of these bands and pass others. Thus a transparent discrete area passes the entire wavelength range and permits production of output signals by the associated photosensitive devices regardless of the particular color selected at the cathode ray tube screen. Assuming that a positive indication in the output circuit is equivalent to a binary "one," a transparent discrete area provides storage for the binary number 111, or 7, and will permit its production in the output register 26 by sequential selection of the three possible colors at the cathode ray tube screen while the light beam is positioned on the transparent discrete area of the storage slide.

A discrete area which is prepared with a filter material so as to pass light in the range 5400 A.–7000 A. will permit a positive response or binary "one" in the output register when in receipt of a light beam in the same wavelength pass band, but it will block the passage of light of either of the remaining two colors. This in turn will prevent the appearance of an output signal thereby indicating a binary "zero" in the output register at this time. The response at the photocell from such a discrete area to light beams of the selected colors at the cathode ray tube screen in sequence is thus the binary number 100, or 4.

Of course a different sequence in the color selection of the light beam will provide a different binary number output from this discrete area such as 010, or 2, and 001, or 1. The particular programing of the system would determine the particular desired readout from each discrete area. Suffice it to say that in the instance of a discrete area on the information storage slide prepared with particular color filter materials, three distinct binary number indications are possible.

Other color filter materials absorb different wavelength bands and thus produce different binary numbers. Finally, an opaque discrete area will block the light beam in all three colors to provide the binary number 000. In this fashion all of the three-digit binary numbers corresponding to the decimal numbers 0 to 7 inclusive may be provided by the appropriate selection of color filter material to be placed on each discrete area of the information storage slide and the sequential color selection at the cathode ray tube.

It is readily apparent that the system may be arranged to provide output signals in the conventional binary code as illustrated, in the reflected binary code, or in other known binary code systems. Information may be read from more than one discrete area consecutively in accordance with the desired programing arrangement to produce binary numbers of a higher order. Thus a six-digit binary number may be produced from the consecutive outputs of two discrete storage areas, etc. The same result may be attained by simultaneous readout from a plurality of storage slides and gating of the resultant signals in proper order into the output register.

The circuitry and arrangements for accurately positioning the light beam on discrete areas of the storage slides to assure readout of the correct information may comprise servo comparison circuit 28, as indicated hereinbefore. In this instance the positioning slide 24 advantageously is prepared with opaque and transparent discrete areas as required in such a positioning system. The combination of this servo arrangement in the instant system utilizing preselected wavelength light beams thus has no effect on the operation of the elements in the servo positioning circuit.

It is to be understood that the above-described arrangement is illustrative of the application of the principles of the invention. Numerous other arrangements may be devised by those skilled in the art without departing from the spirit and scope of the invention.

What is claimed is:

1. A binary information storage system comprising an electron discharge device including a luminescent screen, means for projecting an electron beam against said screen to produce a spot of light on the area of incidence, a positioning member, a storage member having binary information stored thereon in the form of light filter areas, light sensitive means for producing electrical signals in response to light directed thereto from said screen through said positioning member, and means connected between said light sensitive means and said screen for selecting the wavelength of light emanating from the area of incidence.

2. In combination in an information storage system, an information storage member having a plurality of digits of a binary number stored at each of a plurality of discrete areas thereof as one of a plurality of different light transmission characteristics, a positioning member, a cathode ray tube having a color display screen, means for focusing a preselected color light beam from said screen on one of said discrete areas of said storage member, output means positioned to receive light from said screen through said members for generating electrical signals corresponding to light received thereat, and means connected to said output means for controlling the light beam color preselection.

3. A binary information storage system comprising an electron discharge device including a tricolor luminescent screen, means for projecting an electron beam against said screen, means for deflecting said beam and means for controlling said deflected beam to produce a spot of light on the area of incidence in a selected color, an information storage slide having binary information stored on discrete areas thereof, said discrete areas of said slide being arranged to absorb light of certain colors and to transmit therethrough light of all other colors, a positioning slide, means for focusing light on said slides from said selected color spot on said screen, light responsive devices for generating electrical manifestations of light directed thereto, means for focusing light on said devices from said screen through said slides, and means interconnecting said control means and said light responsive device receiving light through said positioning slide.

4. A binary information storage system in accordance with claim 3 wherein said controlling means comprises color switching means for selecting each of said three colors at said screen in sequence at each deflected position of said beam.

5. A binary information storage system in accordance with claim 3 wherein each of said discrete areas of said information storage slide represents a plurality of digits of a binary number and comprises one of a plurality of different color filters.

6. An information storage system comprising an information storage member having a plurality of digits of a binary number stored at each of a plurality of discrete areas thereof as one of a plurality of different light transmission characteristics, a positioning member having correction information stored thereon in the form of opaque and transparent areas, a cathode ray tube having a tricolor screen, means for projecting an electron beam against said screen, means for deflecting said beam to impinge said screen at a selected area of incidence, means for applying a sequence of distinct voltages to said screen to produce light in a sequence of distinct colors emanating from said area of incidence, means for focusing the light from said area of incidence on a corresponding discrete area of said storage member and of said positioning member, output means positioned to receive light from said screen through said members for generating electrical signals corresponding to light received thereat, means for comparing signals from said output means receiving light through said positioning member with input signals applied to said deflection means, and means for applying the signal comparison resultant to said voltage applying means.

7. A binary information storage system in accordance with claim 3 wherein said positioning slide comprises discrete, opaque and transparent areas.

References Cited in the file of this patent

UNITED STATES PATENTS

| | | |
|---|---|---|
| 2,580,073 | Burton | Dec. 25, 1951 |
| 2,590,018 | Koller et al. | Mar. 18, 1952 |
| 2,830,285 | Davis et al. | Apr. 8, 1958 |